United States Patent Office 3,102,890
Patented Sept. 3, 1963

3,102,890
PYRAZOLE DERIVATIVES
Derek Ernest Wright, Exmouth, Devon, England, assignor to May & Baker Limited, Dagenham, England, a British company
No Drawing. Filed Oct. 17, 1960, Ser. No. 62,898
Claims priority, application Great Britain Oct. 26, 1959
3 Claims. (Cl. 260—310)

This invention relates to new pyrazole derivatives of therapeutic utility, to processes for their preparation and to pharmaceutical compositions containing them.

The new pyrazoles of the present invention are the N-substituted nitropyrazoles of the general formula:

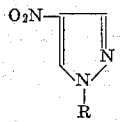

I wherein R is an alkyl group containing one to three carbon atoms or a hydroxyalkyl group containing two to four carbon atoms.

These new compounds show useful activity as antiprotozoal agents, especially in the treatment of trichomoniasis (e.g. that caused by *T. vaginalis*). Of outstanding utility are N-methyl-4-nitropyrazole and N-(2-hydroxyethyl)-4-nitropyrazole.

According to a feature of the invention, the pyrazoles of general Formula I are prepared by a process which comprises either alkylating (including hydroxyalkylating) 4-nitropyrazole or nitrating a compound of the general formula:

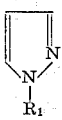

II (wherein $R_1$ is the group R or a group convertible thereto, e.g. an acyloxyalkyl or haloalkyl group such as acetoxyethyl or chloroethyl) by known methods for the nitration of pyrazoles and, if necessary, converting by known methods the group $R_1$ to the desired group R, for example, by hydrolysis.

The alkylation is conveniently effected with a compound of the formula RX (wherein X represents a reactive ester residue such as a halogen atom or a sulphuric or sulphonic ester residue and R is as hereinbefore defined).

The reaction conditions employed will of course depend on the type of reactive ester used but in general the reaction may be carried out in the presence or absence of a solvent such as an alcohol, ketone or benzene hydrocarbon and in the presence or absence of an acid-binding agent such as the alkali metals and their derivatives, including carbonates, hydroxides, alkoxides, amides and hydrides, or tertiary bases such as quinoline. For example, the compound where R is a methyl group may be prepared by reaction of 4-nitropyrazole with dimethyl sulphate in the presence of sodium hydroxide and the compound where R is a β-hydroxyethyl group may be prepared from 4-nitropyrazole by heating it with ethylene chlorohydrin. Alternatively the compounds where R is a hydroxyalkyl group may be prepared by alkylating 4-nitropyrazole with an alkylene oxide such as ethylene oxide.

The nitration step is preferably carried out with a mixture of concentrated nitric and sulphuric acids. The term "known methods" is used herein to mean methods heretofore used or described in the chemical literature.

The compounds of general Formula II are prepared from pyrazole by reaction with a compound of formula $R_1X$ (wherein $R_1$ and X are as hereinbefore defined) using the conditions described above for converting 4-nitropyrazole to compounds of general Formula I. Alternatively, the compounds of general Formula II may be prepared by the condensation of malondialdehyde, or a suitable derivative thereof, e.g. the diacetal (1,1,3,3-tetraethoxypropane), with a hydrazine derivative of the general formula:

R—NH—NH$_2$     III

The following examples illustrate the production of nitropyrazole derivatives according to the invention.

*Example I*

4-nitropyrazole (5.65 g.) was dissolved in N sodium hydroxide (60 ml.), the solution warmed to 30° C. with stirring, and dimethyl sulphate (4.8 ml.) slowly added dropwise. The mixture was then cooled, and the solid which crystallised was filtered off, washed with water and dried at 35° C. Recrystallisation from water (40 ml.) gave colourless prisms of N-methyl-4-nitropyrazole, M.P. 91–92° C.

*Example II*

To a solution of N-methylpyrazole (24.9 g.) in concentrated sulphuric acid (124.5 ml.) was slowly added with stirring and cooling a mixture of concentrated nitric acid (74.7 ml.) and concentrated sulphuric acid (74.7 ml.), keeping the reaction temperature between 5° C. and 10° C. throughout. The mixture was allowed to warm to room temperature, and then heated at 100° C. for 0.5 hour and added to ice. The mixture was neutralised with sodium carbonate and extracted with chloroform. The chloroform extracts were dried over anhydrous sodium sulphate and evaporated to dryness. The residue was recrystallised from ethanol giving N-methyl-4-nitropyrazole as colourless prisms, M.P. 92–93° C.

*Example III*

4-nitropyrazole (32 g.) was mixed with ethylene chlorhydrin (192 ml.) and heated in an oil bath (oil temperature 130±2° C.) for three days. The resulting solution was evaporated to dryness giving a syrup which crystallised on trituration with water (100 ml.). The suspension was made alkaline to phenolphthalein with 2N sodium hydroxide and the product was filtered off, washed with water, and dried in vacuo over sulphuric acid. Recrystallisation from benzene (150 ml.) gave colourless prisms of N-(2-hydroxyethyl) - 4 - nitropyrazole, M.P. 92–94° C.

*Example IV*

N-(2-hydroxyethyl)-pyrazole (2.0 g.) was dissolved in concentrated sulphuric acid (20 ml.), cooled to 10° C. and treated with a mixture of concentrated nitric acid (6 ml.). The solution was maintained at 20° C. for 20 hours, poured onto ice and the resultant suspension neutralised with solid sodium carbonate. The solid was collected, dried and crystallised from a mixture of ethyl acetate and light petroleum to give N-(2-nitratoethyl)-4-nitropyrazole M.P. 51–52° C.

N-(2-nitratoethyl)-4-nitropyrazole (0.3 g.) was heated at 100° C. in 2 N sulphuric acid (10 ml.) for 4 hours. The resulting solution was cooled and neutralised with sodium carbonate. The solid which had separated was collected and crystallised from benzene to give N-(2-hydroxyethyl)-4-nitropyrazole, M.P. 92–94° C.

The N-(2-hydroxyethyl)-pyrazole used as starting material was prepared in the following manner:

2-hydroxyethylhydrazine (7.6 g.) was dissolved in water (10 ml.) and treated with concentrated hydrochloric acid (10 ml.) keeping the temperature below 10° C. The solution was diluted with ethanol (20 ml.) and 1,1,3,3- tetraethoxypropane (22.0 g.) added dropwise at 10° C. After the addition was complete the mixture was heated on a steam bath for 1 hour and then evaporated almost to dryness. After dilution of the residue with water (50 ml.) the solution was adjusted to pH 8 by the addition of solid sodium carbonate and extracted with ether. Distillation of the dried ether extract gave N-(2-hydroxyethyl)-pyrazole as an oil B.P. 90–100° C./0.07 mm. $n_D^{25}$ 1.5065.

*Example V*

N-(2-acetoxyethyl)-pyrazole (2.0 g.) was added to concentrated sulphuric acid (20 ml.) at 10° C. The solution was cooled to 5° C. and treated with a mixture of concentrated nitric acid (6 ml.) and concentrated sulphuric acid (6 ml.). The resulting solution was maintained at 20° C. for 20 hours and then poured onto ice. The suspension so obtained was neutralised by the addition of solid sodium carbonate to give N-(2-nitratoethyl)-4-nitropyrazole, M.P. 51–52° C. This nitrate ester was converted to N-(2-hydroxyethyl)-4-nitropyrazole, M.P. 92–94° C., as described in Example IV.

The N-(2-acetoxyethyl)-pyrazole used as the starting material was prepared in the following manner:

Pyrazole (47 g.) and 2-chloroethyl acetate (236 ml.) were heated at 135° C. for 84 hours. The excess 2-chloroethyl acetate was removed by distillation, the residue dissolved in ether and the ethereal solution washed with 2 N sodium hydroxide. Distillation of the dried ethereal extract gave N-(2-acetoxyethyl)-pyrazole, B.P. 117–121° C./15 mm., $n_D^{21}$ 1.4761.

The present invention includes within its scope pharmaceutical compositions which comprise one or more compounds of general Formula I together with a significant amount of a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the active compounds of the invention is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration, also include capsules of absorbable material such as gelatin containing one or more of the active substances of the invention with or without the addition of diluents or excipients.

For topical application the active material may be incorporated in a suitable vehicle such as a cream, ointment, lotion or suspension, or in a pessary or ovule.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time.

The following example illustrates pharmaceutical compositions according to the invention.

*Example VI*

Tablets were prepared of the formula:

| | Percent |
|---|---|
| N-methyl-4-nitropyrazole | 78.4 |
| Starch | 14.2 |
| Dextrin | 5.5 |
| Sodium carboxymethylcellulose | 0.88 |
| Stearic acid | 0.6 |
| Magnesium stearate | 0.42 |

(wherein the percentages are by weight).

Similarly there may be prepared pharmaceutical compositions in the form of tablets in which the pyrazole compound specified in the preceding example is replaced by a like quantity of the pyrazole products of any one of Examples I to V.

This application is a continuation-in-part of application Serial No. 855,518, filed November 27, 1959, now issued as United States Patent No. 2,979,512.

I claim:

1. A compound of the formula:

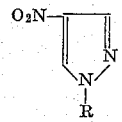

where R is a member of the class consisting of alkyl groups of one to three carbon atoms and hydroxyalkyl groups of two to four carbon atoms.

2. N-methyl-4-nitropyrazole.
3. N-(2-hydroxyethyl)-4-nitropyrazole.

References Cited in the file of this patent

UNITED STATES PATENTS

| 2,831,866 | Freeman et al. | Apr. 22, 1958 |
| 2,844,510 | Lorenz et al. | July 22, 1958 |
| 2,883,373 | Riehen et al. | Apr. 21, 1959 |
| 2,979,512 | Wright | Apr. 11, 1961 |

OTHER REFERENCES

Auwers et al.: Chem. Abstracts, vol. 21, page 2899 (1927).

Finar et al.: Chem. Abstracts, vol. 51, col. 17891–2 (1957).

Noguchi et al.: Chem. Abstracts, vol. 50, col. 13747 (1956).